United States Patent
Ros et al.

(10) Patent No.: US 9,598,221 B2
(45) Date of Patent: Mar. 21, 2017

(54) PACKAGING HAVING A SURROUNDING HEAT BARRIER

(75) Inventors: Nico Ros, Basel (CH); Richard Ettl, Lausanne (CH)

(73) Assignee: REP IP AG, Zug (CH)

( * ) Notice: Subject to any disclaimer, the term of this patent is extended or adjusted under 35 U.S.C. 154(b) by 736 days.

(21) Appl. No.: 14/113,131

(22) PCT Filed: Apr. 23, 2012

(86) PCT No.: PCT/AT2012/000110
§ 371 (c)(1),
(2), (4) Date: Jan. 14, 2014

(87) PCT Pub. No.: WO2012/142639
PCT Pub. Date: Oct. 26, 2012

(65) Prior Publication Data
US 2014/0117026 A1 May 1, 2014

(30) Foreign Application Priority Data

Apr. 21, 2011 (AT) .................................. A 572/2011

(51) Int. Cl.
*B65D 81/38* (2006.01)
*B32B 3/02* (2006.01)
(Continued)

(52) U.S. Cl.
CPC ............ *B65D 81/3823* (2013.01); *B32B 3/02* (2013.01); *B32B 15/04* (2013.01); *B65D 81/38* (2013.01);
(Continued)

(58) Field of Classification Search
CPC B65D 81/3823; B65D 81/38; B65D 81/3818; Y10T 428/24661; Y10T 428/265;
(Continued)

(56) References Cited

U.S. PATENT DOCUMENTS 3,993,811 A 11/1976 Walles
4,618,517 A 10/1986 Simko, Jr.
(Continued)

FOREIGN PATENT DOCUMENTS

WO 2004/016417 A2 2/2004
WO 2004/016417 A3 2/2004
WO 2011/032299 A1 3/2011

OTHER PUBLICATIONS

International Search Report dated Jul. 31, 2012, issued in International Application PCT/AT2012/000110.
(Continued)

*Primary Examiner* — Michael C Miggins
(74) *Attorney, Agent, or Firm* — Fitch, Even, Tabin & Flannery LLP

(57) ABSTRACT

In an insulating element (1) for bounding spaces to be thermally insulated, e.g. for transport or packaging containers, comprising an in particular plate-shaped substrate element (2) made of a material having a low thermal conductivity, such as a polymer, the substrate element (2) is provided with a metallic coating (3) having a low emissivity in order to reduce the thermal radiation, yet is applied in a layer thickness of <80 nm, preferably <50 nm, such that the thermal conduction of the metallic coating will only insignificantly reduce the thus optimized insulating value. The metallic coating in the nanometer range does not only reduce the thermal radiation, but also enables optimal gas tightness with minimal thermal conduction.

21 Claims, 8 Drawing Sheets

(51) Int. Cl.

| | |
|---|---|
| *F28D 20/02* | (2006.01) |
| *B32B 15/04* | (2006.01) |
| *E04B 1/80* | (2006.01) |
| *E04B 1/74* | (2006.01) |
| *E04B 1/76* | (2006.01) |
| *F28D 20/00* | (2006.01) |
| *F25D 3/06* | (2006.01) |

(52) U.S. Cl.
CPC ......... *B65D 81/3818* (2013.01); *F28D 20/02* (2013.01); *E04B 1/803* (2013.01); *E04B 1/806* (2013.01); *E04B 2001/742* (2013.01); *E04B 2001/747* (2013.01); *E04B 2001/748* (2013.01); *E04B 2001/7691* (2013.01); *F25D 3/06* (2013.01); *F25D 2303/0831* (2013.01); *F25D 2303/0843* (2013.01); *F25D 2303/0844* (2013.01); *F25D 2303/0845* (2013.01); *F28D 2020/0008* (2013.01); *F28F 2270/00* (2013.01); *Y02E 60/145* (2013.01); *Y10T 428/24661* (2015.01); *Y10T 428/265* (2015.01)

(58) Field of Classification Search
CPC . B32B 3/02; B32B 15/04; E04B 1/803; E04B 1/806; E04B 2001/742; E04B 2001/747; E04B 2001/748; E04B 2001/7691; F28D 20/02; F28D 2020/0008; F28F 2270/00; Y02E 60/145; F25D 3/06; F25D 2303/0831; F25D 2303/0843; F25D 2303/0844; F25D 2303/0845
See application file for complete search history.

(56) References Cited

U.S. PATENT DOCUMENTS

| | | |
|---|---|---|
| 5,270,092 A | 12/1993 | Griffith et al. |
| 5,913,445 A | 6/1999 | Fujii et al. |
| 2002/0144482 A1 | 10/2002 | Henson et al. |

OTHER PUBLICATIONS

International Preliminary Examination Report dated May 14, 2013, issued in International Application PCT/AT2012/000110.
Wikipedia article, "Vakuumdammplatte", Oct. 30, 2010, 3 pages, http://de.wikipedia.org/w/index/php?title=Vakuumdammplatte&oldid=80917552.

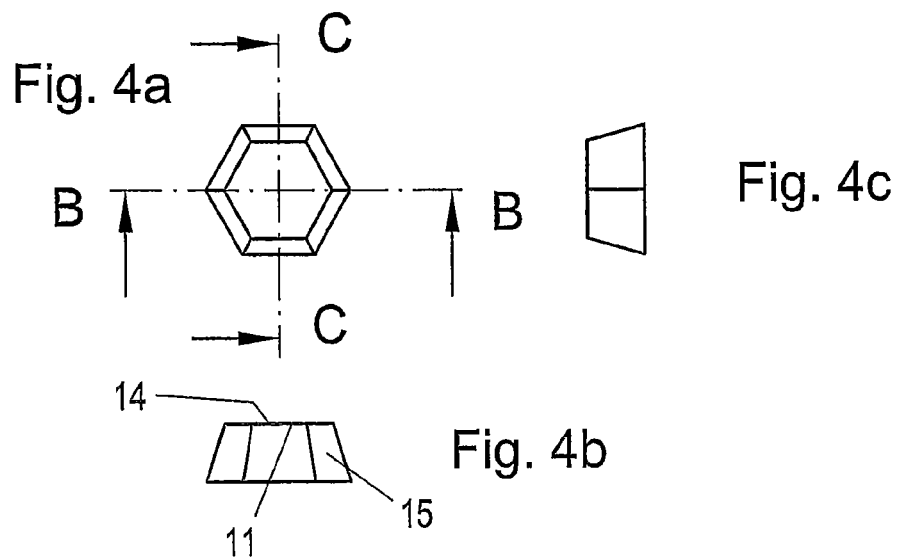
Fig. 4a
Fig. 4c
Fig. 4b
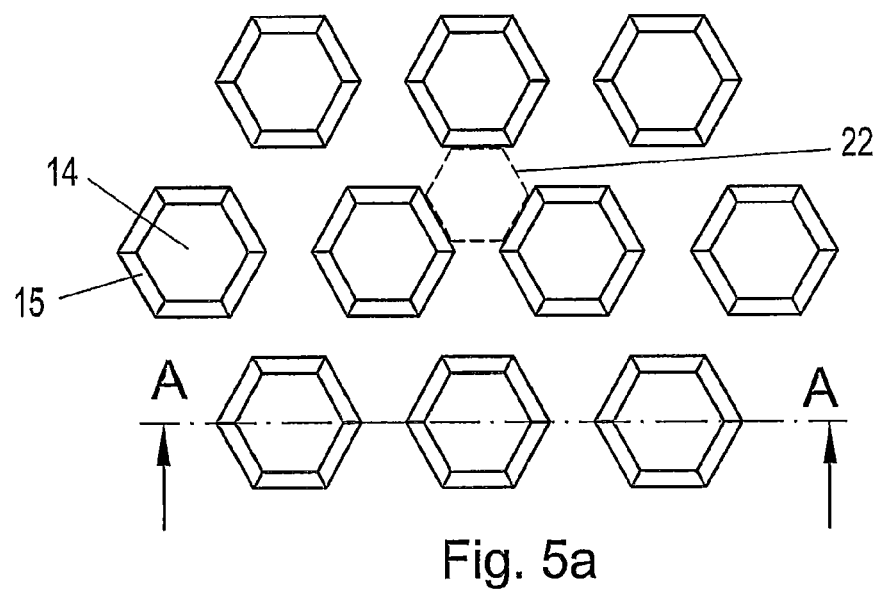
Fig. 5a
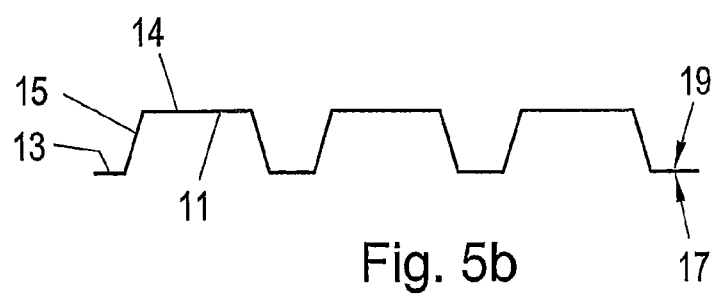
Fig. 5b

PACKAGING HAVING A SURROUNDING HEAT BARRIER

CROSS-REFERENCE TO RELATED APPLICATIONS

This Application is a U.S. National Stage Application filed under 35 U.S.C. §371 of International Application PCT/AT2012/000110, filed Apr. 23, 2012, designating the United States, which claims priority from Austrian Patent Application A 572/2011, filed Apr. 21, 2011, the complete disclosures of which are hereby incorporated herein by reference in their entirety for all purposes.

The invention relates to an insulating element for bounding spaces to be thermally insulated, e.g. for transport or packaging containers, comprising a substrate element made of a material having a low thermal conductivity, such as a polymer. The invention further relates to a container, in particular for packaging purposes, whose walls are each formed by at least one insulating element. The invention further relates to a method for manufacturing an insulating element.

It is already known that a good thermal insulation will be obtained by applying the so-called Dewar principle, which substantially consists in that a highly evacuated space is enclosed between heat-reflecting walls. This principle can above all be used for cylindrical insulating containers. Packaging, storage or transport containers using the Dewar principle will reduce the three possible heat transfer processes, i.e. thermal conduction, thermal radiation, and convection. Thermal conduction is, for instance, influenced by choosing a material with a low thermal conductivity, yet also the shape of the vessel plays a role. Heat transfer by radiation will be reduced by mirroring the container walls. Evacuation prevents heat transfer by convection.

The thermal conductivity, or also coefficient of thermal conductivity ($\lambda$), of a solid, a liquid or a gas is its capacity to transport thermal energy in the form of heat by heat conduction. The (specific) thermal conductivity, measured in watt per Kelvin and meter, is a temperature-dependent material constant. If, in the context of the invention, it is referred to a low thermal conductivity, this is to denote a material having a thermal conductivity of <100 mWm$^{-1}$K$^{-1}$ unless otherwise stated.

With panel-shaped insulating elements, the Dewar principle is less simple to realize than with cylindrical insulating containers, since insulating elements having plane walls require too high a wall thickness in order to be able to withstand the external atmospheric pressure. With panel-shaped insulating elements, no vacuum is, therefore, usually created in a hollow space between the inner and outer walls of the element. With insulating materials for, in particular, panel-shaped insulating elements, the thermal conductivity, the gas tightness and, above all, the reflection of heat rays are of great relevance to the insulation properties. Insulating elements made of polymers, in general, excel by their low thermal conductivity. On the other hand, their gas tightness and heat ray reflection capacity are insufficient. By contrast, metals can be completely gas-tight and reflect heat rays, yet they have so far not been qualified as insulating materials for heat insulation because of their relatively high thermal conductivities.

The invention, therefore, aims to provide an insulating element comprising an in particular plate-shaped substrate element made of a material having a low thermal conductivity, such as a polymer, in which the reflection of thermal radiation and the gas tightness can be significantly increased, yet without reducing the overall thermal conductivity.

To solve this object, departing from an insulating element of the initially defined kind, it is essentially provided according to a first aspect of the invention that the substrate element is provided with a metallic coating having an emissivity of <0.2, preferably 0.02-0.09, to reduce the thermal radiation, and a layer thickness of <80 nm, preferably <50 nm, to minimize the thermal conduction, of the metallic coating. By the present invention, it has become possible to combine the advantage of the low thermal conductivity, e.g. of polymers, of the substrate material with gas-tight metal layers in the nanometer range in such a manner that the insulating material will significantly reflect heat rays and, at the same time, be preferably gas-tightly closed, but the metal layer is constituted such that its thermal conduction will be reduced to a minimum. Metallic coatings in insulating elements are problematic because of their high thermal conductivities, thus involving the risk of the advantages of the low thermal conductivity of the substrate element being at least partially destroyed by the high thermal conductivity of the metallic coating. In the context of the present invention, it has become possible to significantly reduce the emissivity of the thermal radiation (from preferably <0.1), to optimize the gas tightness and, at the same time, minimize the thermal conduction through the metallic coating due to the extremely small layer thickness of <80 nm, in particular, <50 nm. Moreover, the morphology, in particular in the transition zone between the polymer substrate and the metal coating, renders the heat transfer between the metal coating and the substrate element difficult.

A preferred further development provides that the coating is made of silver. Although silver has an extremely high thermal conductivity (429 Wm$^{-1}$K$^{-1}$) such that a layer thickness as thin as possible, preferably below 50 nm, is of particular importance, it excels by its high oxidation resistance, high gas tightness, and antibacterial properties. Due to the antibacterial properties, the insulating element coated with silver is particularly suitable for insulating containers used in the medical field, the silver coating being in any case disposed on the side facing the interior of the container, of the insulating element. In addition, a metal, in particular silver, coating may also be provided on the outer side of the container.

In a particularly preferred manner, the coating is applied by sputter deposition. In doing so, a high sputter yield is observed particularly with silver. Sputtering is particularly beneficial in the context of the invention, since it enables a high layer quality already for very thin layers and allows the formation of a boundary layer on polymers. Sputtering (cathode atomization) is a physical procedure by which atoms are dissolved out of a solid (target) by bombardment with energy-rich ions (primarily noble gas ions) to transition into the gaseous phase. During sputter deposition, a substrate is brought close to the target so as to enable the ejected atoms to condense on the same and form a layer. Sputter deposition is thus a high-vacuum-based coating technique belonging to the group of PVD processes, which is known to the skilled artisan and, therefore, need not be explained in detail here.

The insulating element according to the invention is advantageously configured as a panel, wherein several panels can be assembled to an insulating container if, as in correspondence with a preferred further development, the insulating elements are self-supporting. The panels can, however, also be used as an inner or outer lining of existing containers. The panels preferably comprise connecting elements on their edges so as to enable adjacent panels to be connected to each other in a simple manner. These may, for instance, comprise positive connecting elements such as sections for groove-and-tongue connections.

In order to further improve the insulating properties, it may preferably be provided that the substrate element inherently comprises at least one closed cavity. In a preferred manner, the substrate element comprises a plurality of in particular substantially honeycombed, closed cavities. In particular, a plurality of small cavities is mutually separated by partition walls. In a particularly preferred manner, the walls defining the at least one cavity, or the cavities, are provided with the metallic coating. In this case, in particular, the entire surfaces of the cavities are coated.

The at least one cavity, or the cavities, can be filled with a gas, e.g. air. The at least one cavity can be completely or partially evacuated. This will further reduce the thermal conductivity. Yet, the gas filling may preferably also comprise nitrogen or a noble gas, in particular argon, xenon or krypton. In contemporary insulating materials, gas conduction—as compared to solid conduction—is of decisive importance, since that of air ($\lambda=0.026$ $Wm^{-1}K^{-1}$) is only about one third lower than, for instance, that of polystyrene ($\lambda=0.040$ $Wm^{-1}K^{-1}$). This is why substantial improvements will only be achieved by reducing the conduction of gas. So far, this has above all been achieved either by using noble gases, which have substantially lower thermal conductivities than air, or by applying a vacuum.

In the building industry, insulating materials comprising noble gases are, however, rarely used, because their production involves huge costs, thus being not economical enough. On the other hand, the service lives of vacuum insulations are very short, since their effectiveness is considerably reduced by inflowing air already at pressures between 0.1 and 10 mbar as a function of the support structure.

If, as in correspondence with a preferred further development of the invention, the gas in the cavity/ies is under subatmospheric pressure, in particular under a pressure of 100-700 mbar, the costs for the noble gas filling can be reduced to a fraction due to the reduction of the gas pressure such that an insulating material comprising a gas filling will ever become payable at all in the building industry or for other purposes. In a pressure range in which every vacuum insulation looses its effectiveness, the effectiveness of the noble gas insulation under negative pressure will, however, be preserved so as to ensure a substantially longer service life despite inflowing air.

The thermal insulation can preferably also be improved in that the at least one cavity is filled with a PCM (phase change material which stores heat) device. A PCM device is a device that is able to store thermal energy in a concealed, low-loss manner with many repetition cycles and over a long period of time. To this end, so-called phase change materials are used, whose latent melt heat, dissolution heat or absorption heat is substantially larger than the heat they are able to store on account of their normal specific thermal capacities (without phase conversion effect). The function of PCM devices is based on the utilization of the enthalpy of reversible thermodynamic state changes of a storage medium such as, e.g., the solid-liquid phase transition. The utilization of the solid-liquid phase transition is the principle that is most frequently used in this respect.

A particularly advantageous configuration will result if the substrate element comprises a plurality of in particular honeycomb hollow chambers, a honeycomb structure element according to WO 2011/032299 A1 being of particular advantage.

According to a preferred further development of the invention, the substrate element will be particularly easy and cost-effective to produce if it comprises at least one polymer film that carries the metallic, preferably gas-tight, coating. In this respect, it is, for instance, referred to the honeycomb structure element according to WO 2011/032299 A1. In order to obtain a substrate element having sufficient stability and rigidity despite the use of polymer films, it is preferably provided that the polymer film is patterned to form the at least one cavity, the patterning being preferably realized by deep-drawing of the film. In a preferred manner, the coating is applied on the polymer film on both sides.

According to a second aspect of the invention, a method for manufacturing an insulating element is provided, which method comprises providing a substrate element made of a material having a low thermal conductivity, such as a polymer, with a metallic, preferably gas-tight, coating made, in particular, of silver, said coating being applied at a layer thickness of <80 nm, in particular <50 nm. As already mentioned, the coating is preferably applied by sputter deposition.

Preferably, at least one polymer film which is coated is used as substrate element. In such a case and, in particular, when configuring the substrate element as a honeycomb structure element according to WO 2011/032299 A1, the method can preferably be carried out in that the polymer film is provided with the coating in the non-patterned state, that the coated. film is then patterned by deep-drawing, and that the polymer film is processed into the substrate element in such a manner that the patterning obtained by deep-drawing at least partially defines at least one cavity in the interior of the substrate element. Coating, in particular by sputtering, is thus performed prior to deep-drawing, and it was surprisingly observed that the polymer film will preserve its good reflection properties even after deep-drawing.

A substrate element structure comprising several layers of a coated, preferably patterned, polymer film, as is, for instance, the case with a honeycomb structure according to WO 2011/032299 A1, allows for a reduction of the insulation coefficient of the substrate element, which is 45 $mWm^{-1}K^{-1}$ without coating, to about 30 $mWm^{-1}K^{-1}$ with the silver coating according to the invention.

It is preferably proceeded in such a manner that the coating is applied in at least two coating stages. Thus, a multiple coating will be achieved.

Suitable plastics for the substrate element and the polymer film, respectively, include polyolefins such as polypropylene (PP) or polyethylene (PE), polyamides such as nylon-6 or nylon-6,6, polyurethanes (PU), polystyrene (PS), polyvinylchloride (PVC) or polyesters such as polyethylene terephthalate (PET).

Basically, the insulating elements according to the invention are suitable both for insulating a cold internal atmosphere from a warm environment and for insulating a warm internal atmosphere from a cold environment.

In the following, the invention will be explained in more detail by way of exemplary embodiments schematically illustrated in the drawing. Therein:

FIG. 4a is at top view or a hexagonal honeycomb cell of the honeycomb structure element of FIG. 3;

FIG. 4b is a sectional view through the honeycomb cell of FIG. 4a along line B;

FIG. 4c is a sectional view through the honeycomb cell of FIG. 4a along line C;

FIG. 5a is a top view of a layer of a honeycomb structure element having hexagonal honeycomb cells;

FIG. 5b is a sectional view through the layer of the honeycomb cell of FIG. 5a along line A-A;

FIG. 8 and

Figure 9:
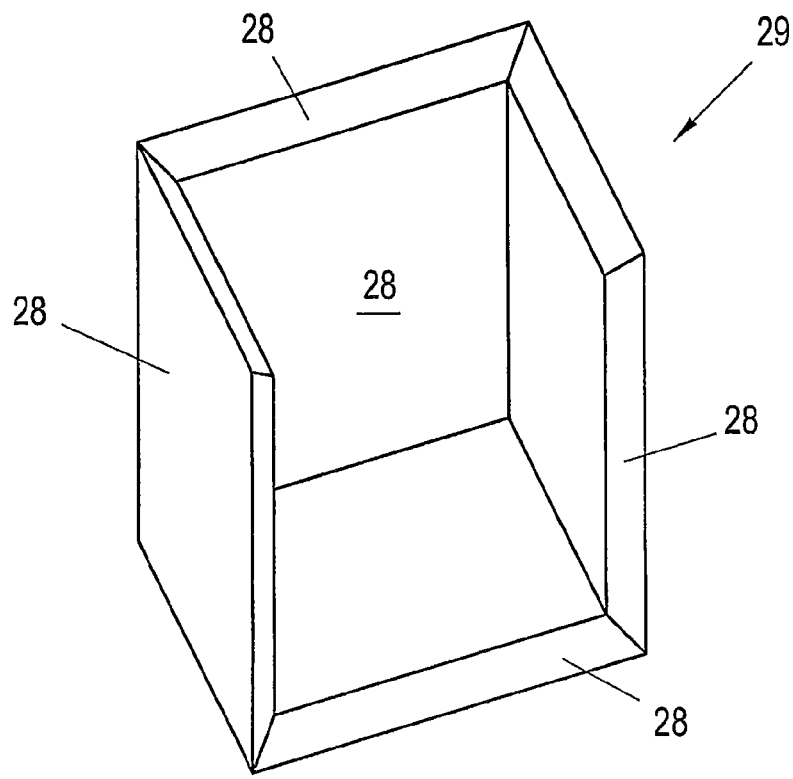
Figure 10:
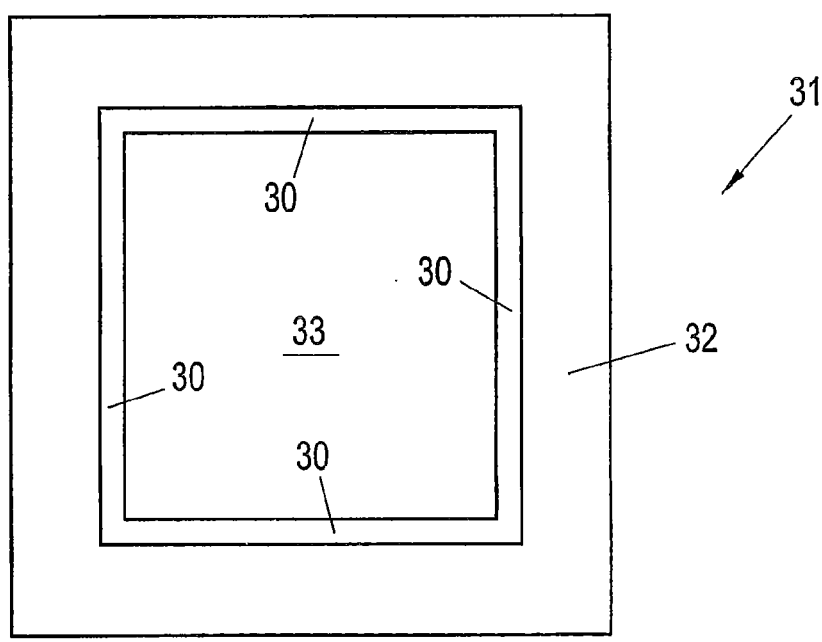

FIG. 9 illustrate insulating elements that are being assembled to form an insulating container; and FIG. 10 illustrates an exemplary embodiment of an insulating container comprising the insulating elements according to the invention.

Figure 1:
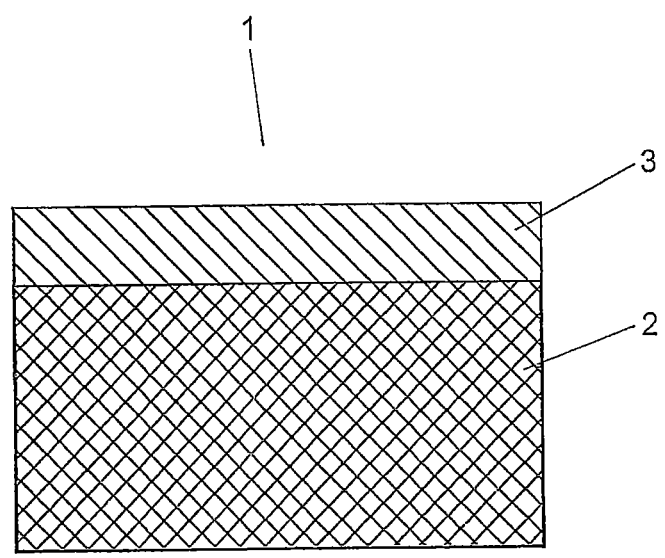
FIG. 1 depicts the insulating element according to the invention in a first embodiment.

In FIG. 1, an insulating element is denoted by 1, comprising a substrate element 2 made of a polymer, e.g. a polyolefin such as polypropylene (PP) or polyethylene (PE), a polyamide such as nylon-6 or nylon-6,6, polyurethane (PU), polystyrene (PS), polyvinylchloride (PVC) or polyester such as polyethylene terephthalate (PET). The substrate element may be a polymer film having a thickness of 0.05 to 0.5 mm. The substrate element can, however, also be configured as a self-supporting component having a thickness of >3 mm. Furthermore, the substrate element may comprise closed chambers. The substrate element comprises a coating 3, preferably made of silver, on at least one side. The silver coating has a thickness of <80 nm, in particular <50 nm, preferably <30 nm.

Figure 2:
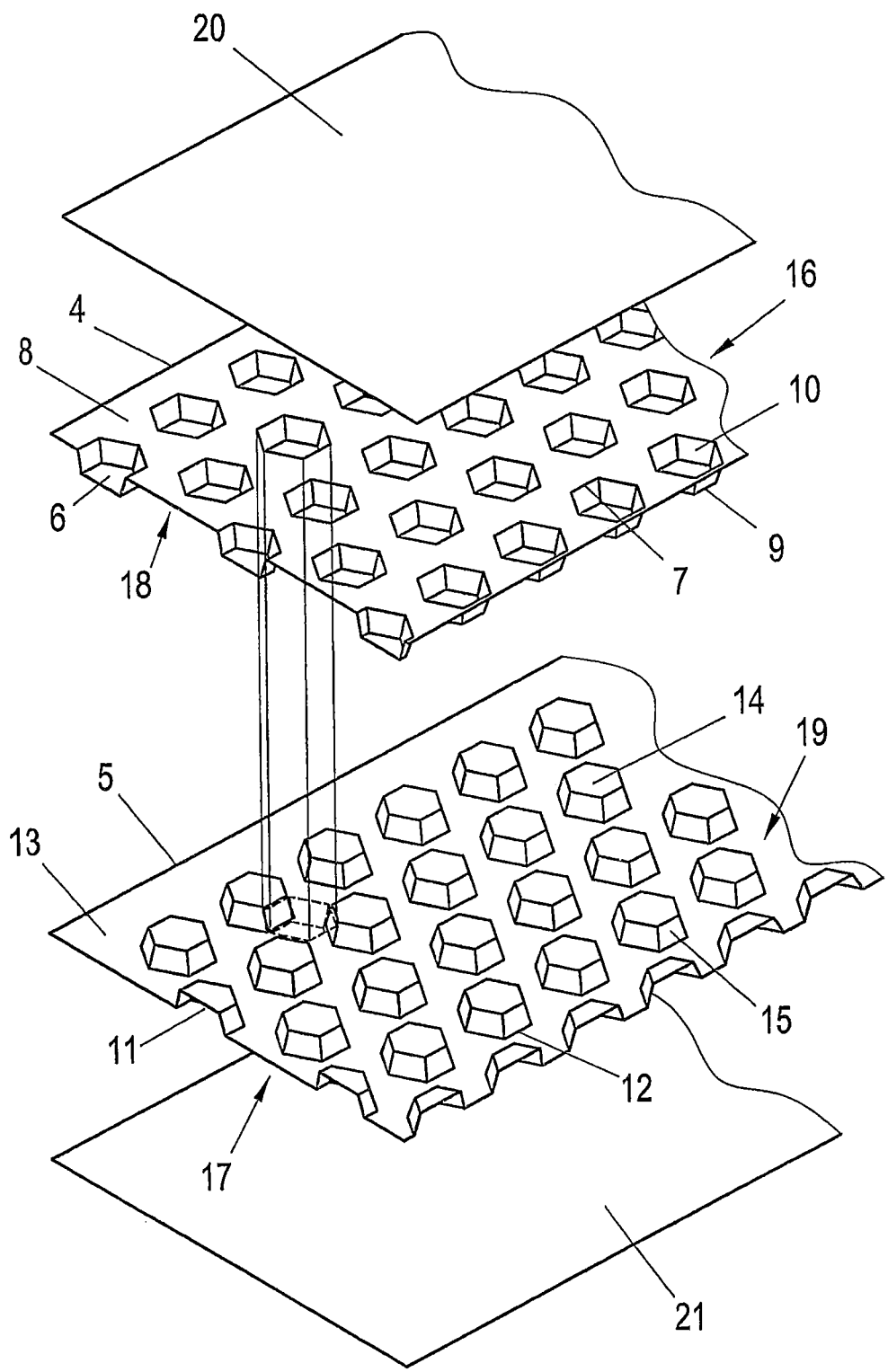
FIG. 2 depicts the insulating element according to the invention in a second embodiment in the form of a honeycomb structure element comprising a plurality of layers.

FIG. 2 depicts a second exemplary embodiment, in which the insulating element is configured as a honeycomb structure element, its individual parts comprising two layers 4 and 5. The first layer 4 is a layer having depressions in the form of honeycomb cells 6 that are each open one side and whose edge shape 7 in the layer plane 8 is as hexagonal as on the end of the depression 6, i.e. on its base 9. The wall surfaces 10 of the depressions 6 are substantially rectangular, preferably trapezoidal, and substantially perpendicular, preferably slightly inclined, relative to the layer plane 8. The second layer 5 is a layer having depressions in the form of honeycomb cells 11 that are each open one side and whose edge shape 12 in the layer plane 13 is as hexagonal as on the end of the depression 11, i.e. on its base 14. The wall surfaces 15 of the depressions 11 are substantially rectangular, preferably trapezoidal, and substantially perpendicular, preferably slightly inclined, relative to the layer plane 13. The two sides further comprise plane surfaces 16 and 17 at the front side and plane surfaces 18 and 19 at the rear side. Rear side is to be understood as that side in which, for instance, the deep-drawing of a depression is performed, whereas front side is that side which, for instance, remains unchangedly flat during deep-drawing.

Moreover, FIG. 2 depicts a second embodiment with four layers also by its individual parts. In addition to the two already described layers, this exemplary embodiment further comprises two flat layers 20 and 21. The metal coating according to the invention can in this case be applied on the outer side of one of the two layers 20 and 21, or on both layers 20 and 21. Additionally or alternatively, the layers 4 and 5 may also be provided with reflecting metal coatings.

Figure 3:
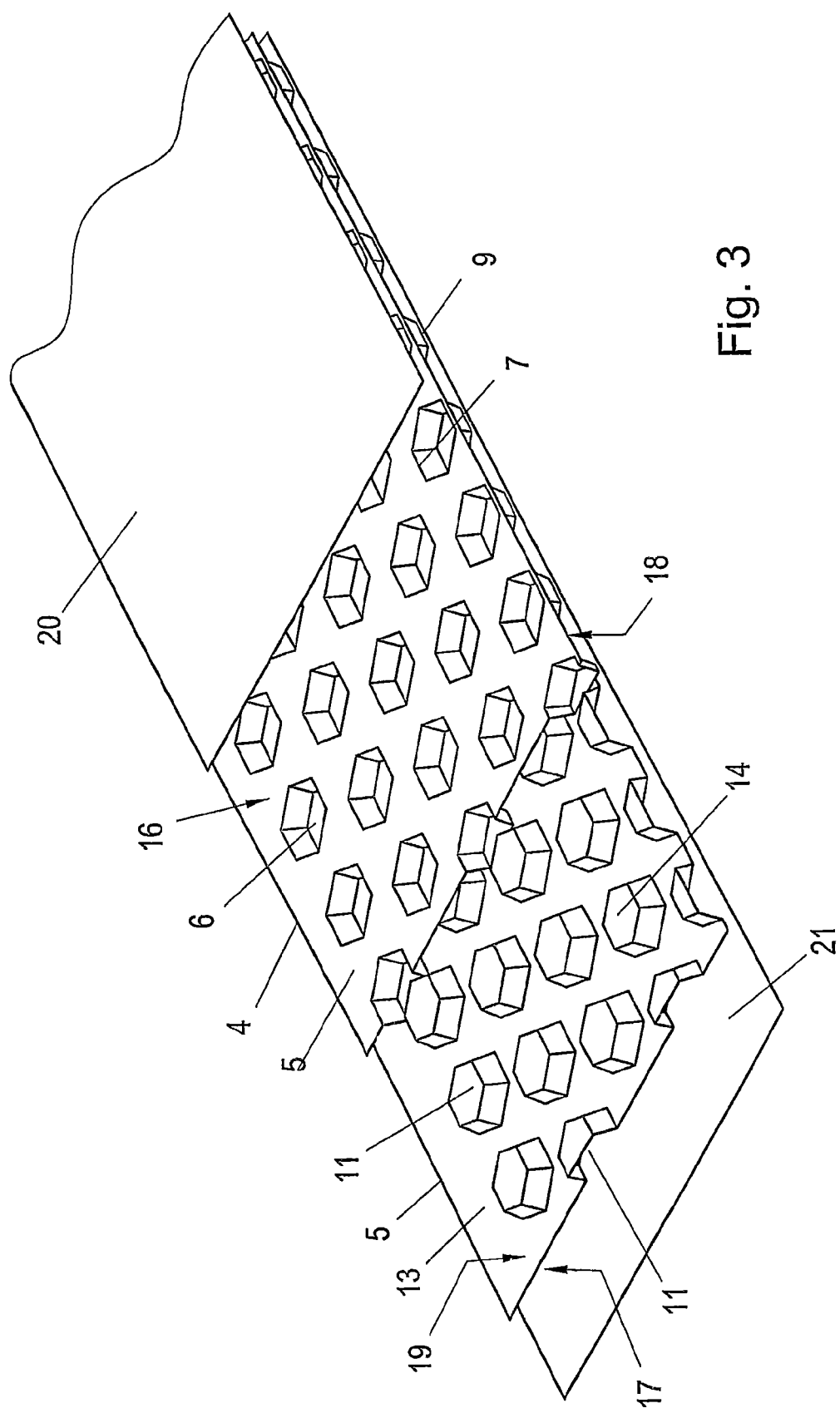
FIG. 3 depicts an assembled honeycomb structure element of FIG. 2.

FIG. 3 illustrates an assembled honeycomb structure element of the second exemplary embodiment of FIG. 2, wherein the depressions 6 and 11 of the two patterned layers 4 and 5 engage each other in such a manner as to form closed honeycomb cells, which are not visible in the Figure due to the chosen form of representation, and are consequently not provided with reference numerals, yet will be readily recognized in subsequent Figures. The bases 9 and 14 of the unilaterally open honeycomb cells 6 and 11 contact the surfaces 18 and 19 that are plane at the rear side, of the respectively oppositely located patterned layer. The two flat layers 20 and 21 by contrast contact the surfaces 16 and 17 that are plane at the front side, of the respective, patterned layer, thus closing the honeycomb cells 6 and 11, which are open on one side. Except for the honeycomb cells provided on the edges of the honeycomb structure element, all of the honeycomb cells are thus closed in this exemplary embodiment.

FIG. 4 depicts a detail of the exemplary embodiment of FIG. 3. A single hexagonal honeycomb cell is shown in top view in FIG. 4a, and two sectional views are represented in FIG. 4b along line B and in FIG. 4c along line C, respectively, of FIG. 4a. The unilaterally open honeycomb cell on its end 11 has a hexagonal base 14 and wall surfaces 15 substantially perpendicular, preferably slightly inclined, thereto, which are substantially rectangular, preferably trapezoidal.

FIG. 5 illustrates a portion of the exemplary embodiment according to FIG. 3. FIG. 5a, in top view, depicts a patterned layer of a honeycomb structure element having hexagonal honeycomb cells, and FIG. 5b is a sectional view along line A-A of FIG. 5a. The honeycomb cells, which are open on one side, of the patterned layer have hexagonal bases 14 on their ends 11 and wall surfaces 15 substantially perpendicular, preferably slightly inclined, thereto. Furthermore, the patterned layer has a plane surface 17 on its front side and a plane surface 19 on its rear side. The side into which, for instance, the deep-drawing of a depression is effected is referred to as rear side, whereas the front side is that side which will, for instance, remain unchangedly flat during deep-drawing. FIG. 5a, moreover, indicates in broken lines where a closed honeycomb cell 22 having a hexagonal base is formed as a secondary structure as two complementary, patterned layers are assembled.

Figure 6:
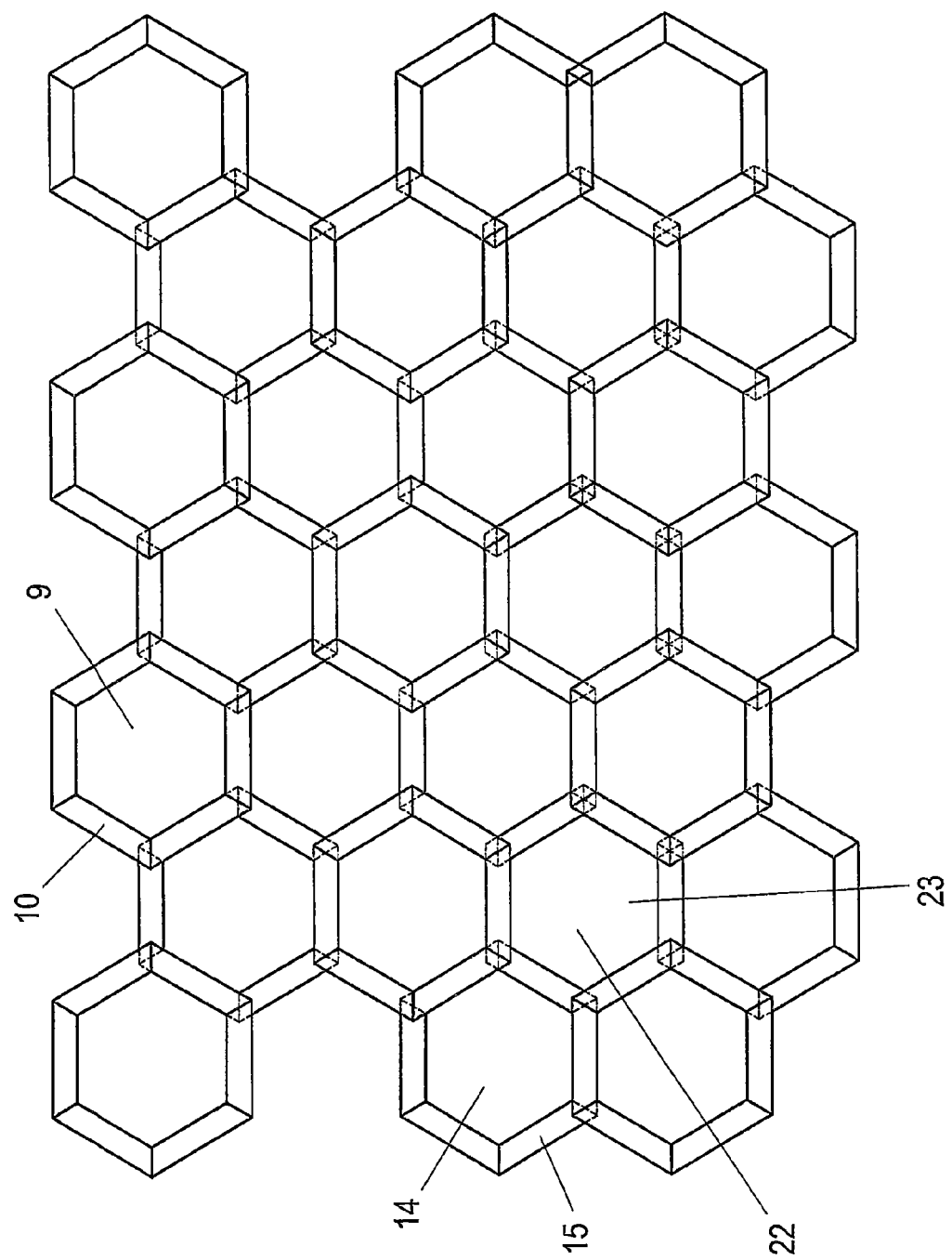
FIG. 6 is a top view of a honeycomb structure element comprising two assembled layers to form closed honeycomb cells.

FIG. 6 is a schematic top view of the honeycomb structure element of FIG. 3, which comprises two assembled layers (4 and 5, analogously to the illustration in the preceding Figures) providing honeycomb cells 6 having bases 9 and wall surfaces 10 as well as honeycomb cells 11 having bases 14 and wall surfaces 15 to form closed honeycomb cells 22 having bases 23, whose wall surfaces each form half of the wall surfaces 10 of the honeycomb cells 6 and wall surfaces 15 of the honeycomb cells 11. Assuming that both the honeycomb cells 6 and the honeycomb cells 11 are honeycomb cells that are open on one side, a honeycomb structure element will be obtained, in which one third of the honeycomb cells 22 are closed except for the edge regions of the honeycomb structure element. In a further developed exemplary embodiment, a honeycomb structure element in which all of the honeycomb cells (6, 11 and 22) except those in edge regions are closed will be obtained therefrom by providing appropriate cover layers.

Figure 7:
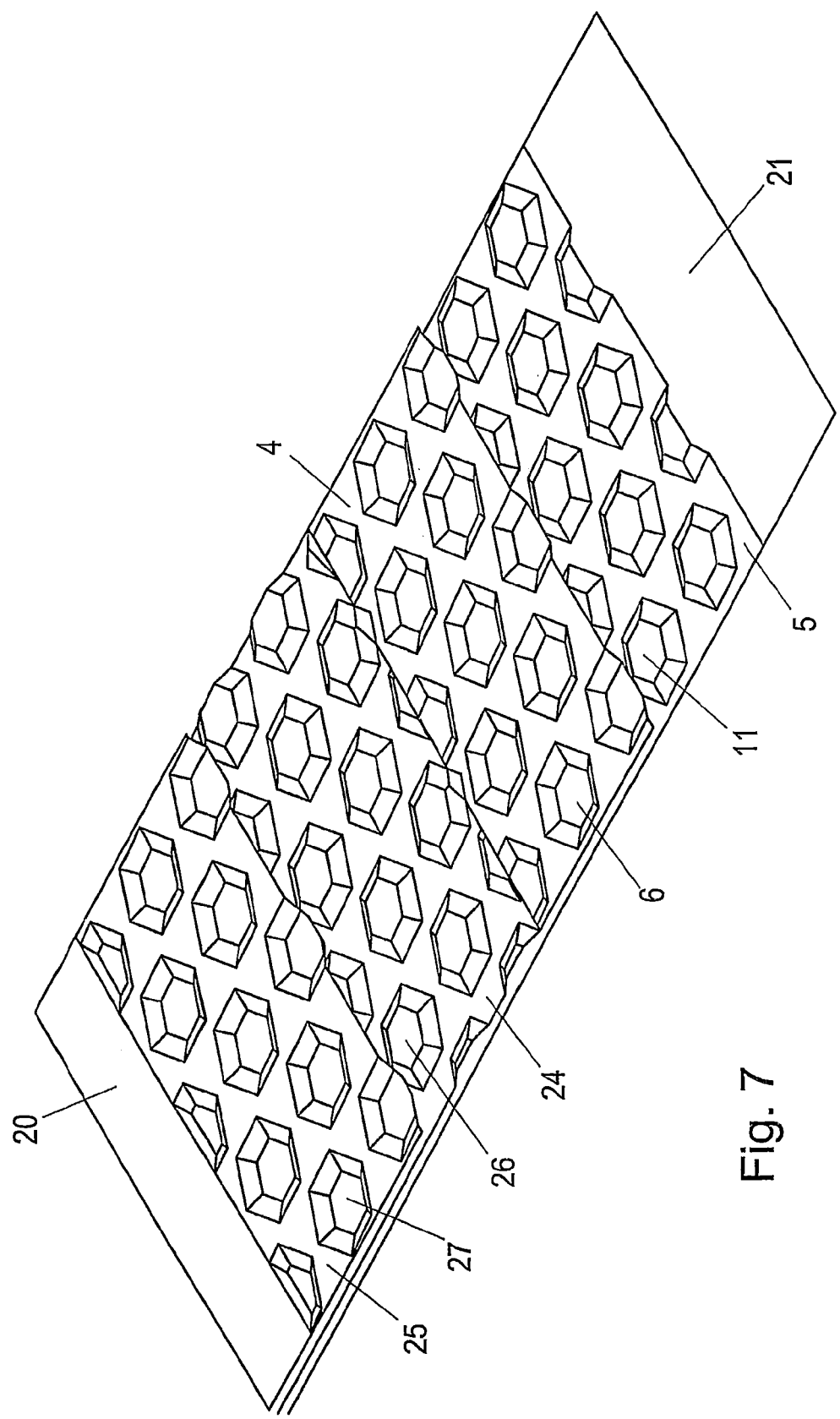
FIG. 7 depicts a further exemplary embodiment of an insulating element comprising several honeycomb structure elements.

FIG. 7 illustrates a modified exemplary embodiment of a honeycomb structure element, in which two further patterned layers 24 and 25 are arranged between the two flat layers 20 and 21 in addition to the patterned layers 4 and 5 provided in FIG. 2, said two further patterned layers comprising depressions formed by unilaterally open honeycomb cells 26 and 27 just as the two patterned layers 4 and 5. The honeycomb cells 26 and 27 are arranged relative to one another just as the honeycomb cells 6 and 11 of the layers 4 and 5, respectively.

Figure 8:
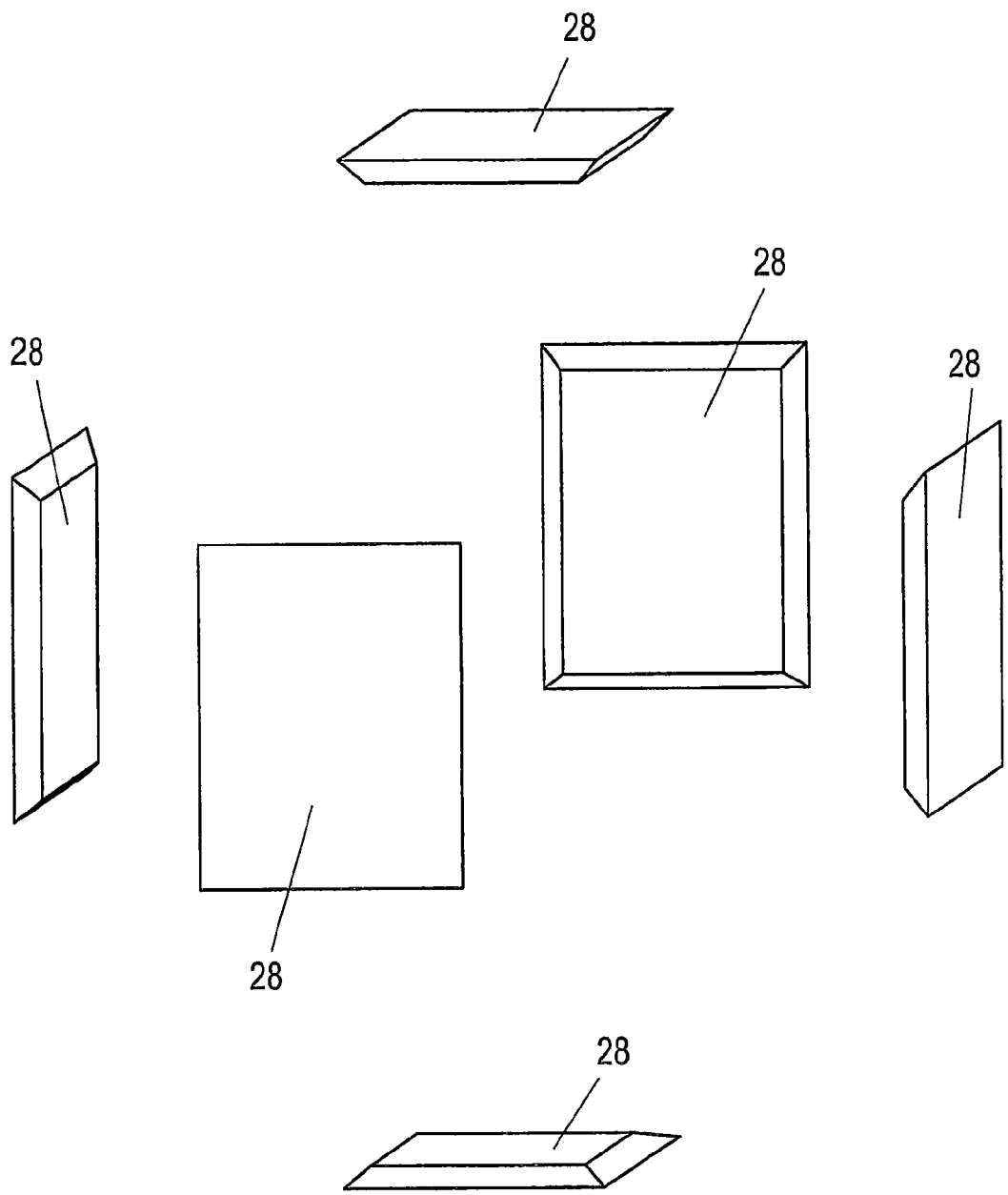

FIGS. 8 and 9 depict insulating elements 28 that are assembled to form an insulating container 29. These may be insulating elements according to any one of the previously described exemplary embodiments, e.g. an insulating element according to FIG. 1, according to FIGS. 2-6, or according to FIG. 7. From the exploded view according to FIG. 8, it is apparent that each of the container walls of the parallelepiped-shaped container is formed by an insulating element 28. The insulating container according to the invention may, however, have any desired shape and, for instance, also be spherical, pyramid-shaped etc.

FIG. 10 depicts the cross section of an insulating container 31 whose internal elements 30, which completely surround the cooling space 33, are filled with PCM devices. These elements 30 filled with PCM devices can be realized as independent modules or part of an insulating element or insulating container. The elements 30 may, for instance, be insulating elements according to FIGS. 2-7, whose honeycomb cells are filled with PCM devices. The insulating container 31 comprises a shell 32 which is, for instance, composed of wall elements to whose inner sides an insulating element 30 is each attached.

In all of the previously described exemplary embodiments, the honeycomb cells may comprise gas fillings. Gases to be considered include, for instance, a gas having a thermal conductivity of <22 mWm$^{-1}$K$^{-1}$, such as, in particular, noble gases, e.g. xenon, krypton or argon. Within the honeycomb cells, subatmospheric pressure is preferably maintained. The gas pressure within the cells is preferably 100-700 mbar.

The invention claimed is:

1. An insulating element with an optimized insulating value for bounding spaces to be thermally insulated for transport or packaging containers, comprising a plate-shaped substrate element made of a material having a low thermal conductivity, wherein the substrate element is provided with a metallic coating having an emissivity of <0.2 and a layer thickness of <80 nm, and wherein the substrate element comprises a plurality of substantially honeycombed, closed cavities in which the walls that define the cavities are provided with the metallic coating.

2. An insulating element according to claim 1, wherein the coating is made of silver.

3. An insulating element according to claim 1, wherein the coating is applied by sputter deposition.

4. An insulating element according to claim 1, wherein the coating is gas-tight.

5. An insulating element according to claim 1, wherein the insulating element is configured as a panel.

6. An insulating element according to claim 1, wherein at least one of said cavities is completely or partially evacuated.

7. An insulating element according to claim 1, wherein the at least one cavity is filled with a PCM (phase change material) for storing heat.

8. An insulating element according to claim 1, wherein it is self-supporting.

9. An insulating element according to claim 1, wherein the coating is gas-tight, at least one of said cavities is filled with a gas having a low thermal conductivity of <22 mWm$^{-1}$K$^{-1}$, said gas comprising a noble gas, wherein the gas is under a pressure of 100-700 bar.

10. An insulating element according to claim 1, wherein said material comprises a polymeric material.

11. An insulating element according to claim 1, wherein said emissivity is 0.02-0.09.

12. An insulating element according to claim 1, wherein at least one of said cavities is filled with a gas having a low thermal conductivity of <22 mWm$^{-1}$K$^{-1}$.

13. An insulating element according to claim 12, wherein the gas is under subatmospheric pressure.

14. An insulating element according to claim 12, wherein the gas is xenon, krypton or argon.

15. An insulating element according to claim 1, wherein the substrate element comprises at least one polymer film that carries the metallic coating.

16. An insulating element according to claim 15, wherein the polymer film is patterned to form at least one of said cavities by deep-drawing of the film.

17. A container comprising walls, wherein said walls are each formed by at least one insulating element according to claim 1.

18. A method for manufacturing an insulating element according to claim 1, said method comprising:
    providing a substrate element comprising a polymer film having a low thermal conductivity with a metallic coating made, said coating being applied at a layer thickness of <80 nm, wherein the polymer film is provided with the coating while in a non-patterned state;
    patterning the coated polymer film by deep-drawing to produce a plurality of cavities; and
    processing the patterned polymer film is processed into the substrate element,
    wherein the patterning obtained by deep-drawing produces a plurality of cavities in the interior of the substrate element.

19. A method according to claim 18, wherein the coating is applied by sputter deposition.

20. A method according to claim 18, wherein the coating is applied in at least two coating stages.

21. A method according to claim 18, wherein the metallic coating is comprised of silver.

* * * * *